United States Patent [19]

Nagasubramanian et al.

[11] 4,168,297
[45] Sep. 18, 1979

[54] RECOVERY OF TIO₂ FROM ILMENITE-TYPE ORE USING AN ORGANOPHOSPHORIC ACID EXTRACTANT FOR IMPURITY IRON REMOVAL

[75] Inventors: Krishnamurthy Nagasubramanian, Denville; Kang-Jen Liu, Bridgewater, both of N.J.

[73] Assignee: Allied Chemical Corporation, Morris Township, Morris County, N.J.

[21] Appl. No.: 967,818

[22] Filed: Dec. 8, 1978

Related U.S. Application Data

[63] Continuation-in-part of Ser. No. 851,222, Nov. 14, 1977, abandoned.

[51] Int. Cl.² .................. C01G 23/06; C01G 49/10
[52] U.S. Cl. ........................... 423/70; 423/82; 423/85; 423/139; 423/611
[58] Field of Search ............... 423/70, 139, 82, 85, 423/611

[56] References Cited

U.S. PATENT DOCUMENTS

| | | | |
|---|---|---|---|
| 3,145,081 | 8/1964 | Surls et al. | 423/112 |
| 3,320,032 | 5/1967 | Feller | 423/139 |
| 3,666,446 | 5/1972 | Cook et al. | 423/139 |
| 3,966,569 | 6/1976 | Reinhardt et al. | 423/139 |
| 4,082,832 | 4/1978 | Watanabe et al. | 423/70 |

OTHER PUBLICATIONS

Barksdale, J., *Titanium*, 2nd. Ed., Ronald Press, NY, pp. 253, 254.
Ritcey, G. M. et al., "Development of a Solvent Extraction Process for the Separation of Cobalt from Nickel", *CIM Bulletin*, (Jan. 1975), pp. 111–123.
Kimura, K., *Chemical Society of Japan Bulletin*, vol. 33, No. 8, pp. 1038–1046.
Kimura, K., *Chemical Society of Japan Bulletin*, vol. 34, No. 1, pp. 63–68.
Morrison et al., *Solvent Extraction in Analytical Chemistry*, John Wiley & Sons, NY, 1957, pp. 56, 57, 110.
*Chemical Abstracts*, vol. 79, (1973), p. 203, Abstract No. 8281u, Koshul'ko, L.P., "Extraction of Scandium, Titanium and Iron (II) by Bis(2–ethylhexyl) hydrogen phosphate".
*Chemical Abstracts*, vol. 85 (1976), p. 505, Abstract No. 167,426k, Favorskaya, L. et al., "Extraction of Titanium IV and Iron (II) by di-2-ethylhexyl phosphoric acid".
Habashi, F., *Principles of Extractive Metallurgy*, vol. II, Gordon and Breach, N.Y. (1970), pp. 175, 176, 341, 369, 382, 385.

*Primary Examiner*—Brian Hearn
*Attorney, Agent, or Firm*—Robert J. North; Robert A. Harman

[57] ABSTRACT

An improved process is described for producing titanium dioxide from ilmenite-type ore. The ore is digested with aqueous hydrogen fluoride, the resulting liquid mixture treated with a water-soluble oxidizing agent, and the ferric iron impurities, in the resulting digestion solution, at a pH between about 1.0 and 6.0, are extracted out with a mono-or dialkyl, or mono- or di-(alkylphenyl) orthophosphoric acid, such as di-(2-ethylhexyl) orthophosphoric acid. The remaining solution is treated with ammonium hydroxide to precipitate hydrated titanium dioxide which is then calcined to form pigmentary titanium dioxide. Alkali metal and ammonium salts of the organophosphoric acid are also useful in the process.

13 Claims, 1 Drawing Figure

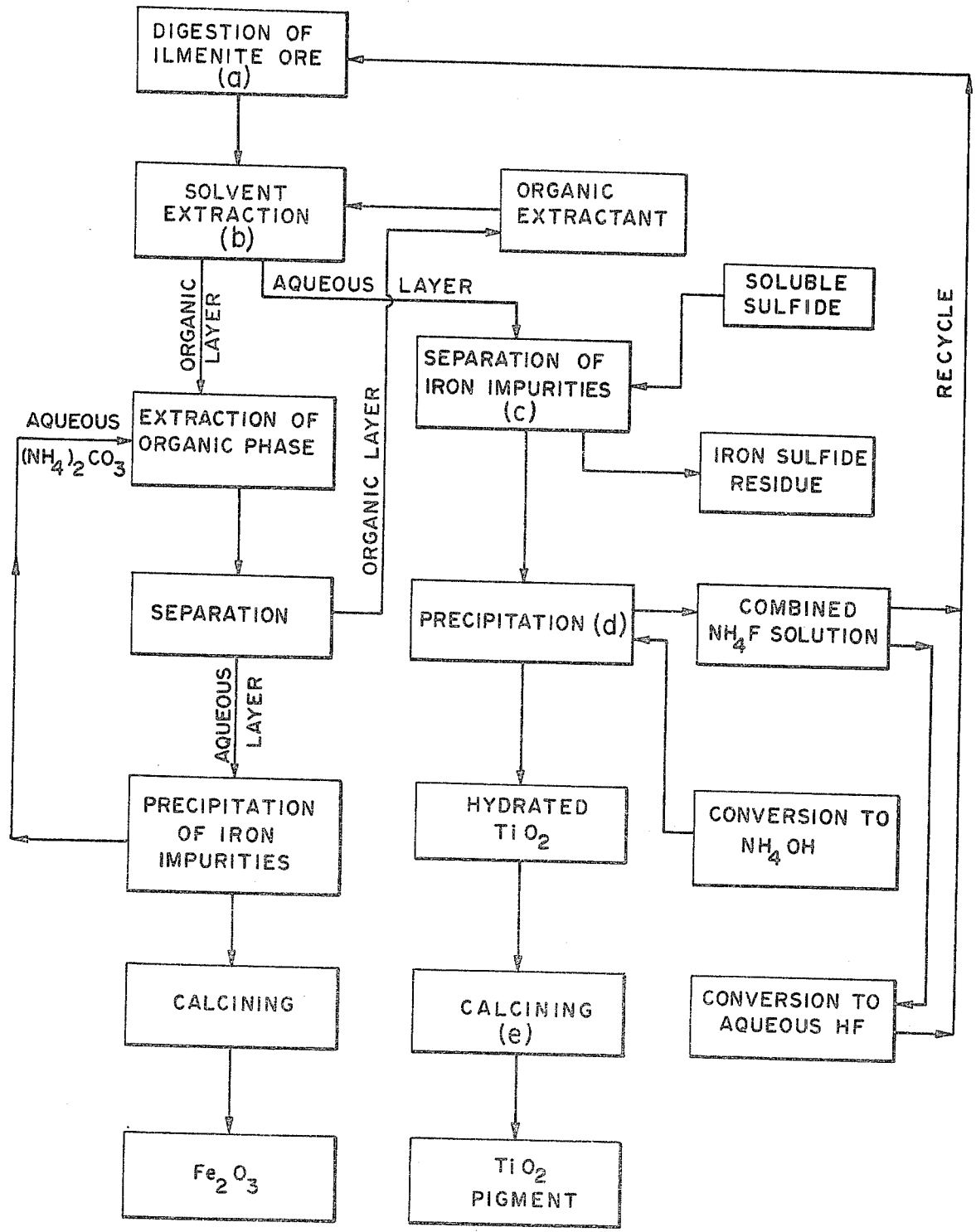

RECOVERY OF TiO₂ FROM ILMENITE-TYPE ORE USING AN ORGANOPHOSPHORIC ACID EXTRACTANT FOR IMPURITY IRON REMOVAL

RELATED CO-PENDING APPLICATION

This application is a continuation-in-part of co-pending application Ser. No. 851,222, filed Nov. 14, 1977, now abandoned.

BACKGROUND OF THE INVENTION

1. Field of Use

This invention relates to an improved process for producing $TiO_2$ from ilmenite-type ores wherein undesirable iron impurities are removed from an acid solution of the digested ore by first converting the iron impurities to the ferric form and then by conducting a liquid-liquid extraction of the ferric iron impurities using an organophosphoric acid, or salt thereof, as the extracting agent.

2. Brief Description of the Prior Art

Titanium dioxide is a well known material which is useful as a pigment for a wide variety of applications such as interior and exterior paints and automotive finishes. A main source for the production of $TiO_2$ is from ilmenite-type ores which are generally of the formula $TiO_2 \cdot FeO$. A prior art process for treatment of the ore is described in U.S. Pat. No. 2,042,435 (1936) which involves removal of iron impurities from the digestion step, prior to isolation of $TiO_2$, because of the adverse affect of the impurities on the final color and pigmentary properties of formed $TiO_2$. The ore may be treated with aqueous hydrogen fluoride, aqueous ammonium fluoride or dry ammonium fluoride, in the initial digestion step, and subsequently, ammonium fluoride solution is added to substantially precipitate the iron impurities as insoluble iron ammonium fluoride salts. However, this step necessitates the use of large amounts of aqueous ammonium fluoride solutions which adds to the total amount of liquid aqueous solutions which must be handled and recycled in the process. Alternate processes for separating out the iron impurities which do not involve large aqueous volumes would be highly desirable.

The use of organophosphoric acids in extracting metal values from aqueous solutions has been described in the art.

The reference, *J. Phys. Chem.*, 64, 89–94 (1960), describes the use of di-(2-ethylhexyl)orthophosphoric acid in n-octane solution for extracting iron (III) values from aqueous acidic perchlorate solutions.

The reference, *Solvent Extr. Proc. Int. Solvent Extr. Conf.* 1971, 1, 238–48, describes the use of a solution of di-(2-ethylhexyl)orthophosphoric acid in kerosene for extraction of iron (III) values from aqueous acidic hydrogen chloride and sulfuric acid solutions.

British Pat. No. 970,885 (1964) describes the use of mono- or dialkyl substituted orthophosphoric acids as extractants for leaching out titanium values, and the use of trialkyl phosphates for extracting iron impurities, from sulfuric acid digestion solutions of ilmenite-type ore. Specifically disclosed is the use of di-(2-ethylhexyl)orthophosphoric acid, dissolved in kerosene, for extracting out titanium values along with a small portion of iron impurities from an aqueous sulfuric solution, leaving substantially all of the iron impurities in the aqueous layer.

However, no specific mention is made in the above references as to the possible utility of the organic extractant in extracting out metal values, particularly ferric iron impurities, from aqueous acidic fluoride solutions containing dissolved titanium values.

We have unexpectedly found that iron impurities can be substantially extracted out of aqueous acidic fluoride solutions, containing titanium values by first converting the iron impurities to the ferric form and then extracting same by the use of a mono- or dialkyl, or mono- or di(alkylphenyl)orthophosphoric acid, or alkali metal or ammonium salt thereof, wherein the alkyl radical is linear or branched and contains 4 to 18 carbon atoms. Extraction yields of over about 99 numerical percent of the iron impurities present can be achieved. A preferred extractant in the process is di-(2-ethylhexyl)orthophosphoric acid.

SUMMARY OF THE INVENTION

In accordance with this invention there is provided an improved process for producing titanium dioxide from ilmenite-type ore including the steps of:

(a) digesting ilmenite ore with aqueous hydrogen fluoride to form a solution of titanium fluoride compounds and soluble iron impurities;

(b) separating substantially the iron impurities from the solution;

(c) separating the remainder of iron impurities by precipitating with ammonium sulfide and filtering off;

(d) precipitating soluble titanium fluoride compounds with ammonium hydroxide to form hydrated titanium dioxide and aqueous ammonium fluoride; and (e) calcining the hydrated titanium dioxide to form pigmentary titanium dioxide; wherein the improvement comprises contacting the solution in (a) at a pH between about 1.0 and 6.0 with a water-soluble oxidizing agent and separating the resulting ferric iron impurities in step (b) by a liquid-liquid extraction of the ferric iron impurities using as extractant a mono- or dialkyl, or mono- or di-(alkylphenyl)orthophosphoric acid, or alkali metal or ammonium salt thereof, wherein the alkyl radical is linear or branched and contains 4 to 18 carbon atoms.

Further provided is a process for extracting out ferric iron values from an aqueous acidic fluoride solution, at a pH between about 1.0 and 6.0, consisting essentially of dissolved titanium and ferric iron values, comprising contacting said solution with a solution of a mono-/or dialkyl orthophosphoric acid, or alkali metal or ammonium salt thereof, wherein the alkyl group is linear or branched and contains 4 to 18 carbon atoms, in an inert organic solvent.

BRIEF DESCRIPTION OF THE DRAWINGS

FIG. 1 is a schematic flow diagram illustrating the improved process of this invention showing the process steps in sequential manner for converting ilmenite-type ore to pigmentary $TiO_2$. Included is the novel step (b), wherein ferric iron impurities are extracted out of the aqueous acidic fluoride solution, previously treated with a water-soluble oxidizing agent in step (a), with an organophosphoric acid as extractant.

DESCRIPTION OF THE INVENTION AND PREFERRED EMBODIMENTS

Description of the invention can be made by reference to FIG. 1. In process step (a), digestion of the ilmenite-type ore is conducted with aqueous hydrogen fluoride, aqueous ammonium fluoride or an ammonium fluoride melt. If aqueous ammonium fluoride or an ammonium fluoride melt is used, then aqueous hydrogen fluoride may be added following the digestion to substantially dissolve titanium metal values. A small amount of oxidizing agent, such as hydrogen peroxide, is added to completely oxidize the iron impurities to the iron (III) valence state, i.e. ferric form, prior to extraction. The resulting aqueous acidic solution, which usually has a pH of 1 to 4 depending on the amount of excess HF used in the digestion step, is then extracted with an organophosphoric acid extractant in step (b) to substantially remove the ferric iron impurities. The organic extractant is a mono- or dialkyl, or mono- or di-(alkylphenyl)orthophosphoric acid, or alkali metal or ammonium salt thereof, such as di-(2-ethylhexyl)orthophosphoric acid, usually dissolved in an inert organic solvent such as kerosene.

Following extraction, the aqueous layer is then treated with a soluble sulfide in step (c) to remove the last traces of iron impurities still remaining in the aqueous layer. The addition of the soluble sulfide is most effective for the residual iron where the solution pH is maintained near neutrality, i.e. 6.5 to 7.0. This can be achieved through addition of soluble sulfides such as $NH_4$, or $Na_2S$, or through simultaneous addition of base and $H_2S$. Optionally, instead of treatment with a soluble sulfide, the aqueous layer may be extracted again with another portion of organic extractant to substantially completely remove the ferric iron impurities. Since this would normally necessitate a second extraction, it is usually more convenient and economical to remove the small remainder of the ferric iron impurities with a water-soluble sulfide such as ammonium sulfide. After the soluble sulfide has been added, resulting in the precipitation of insoluble iron sulfide, the iron sulfide is filtered off as residue and the remaining iron-free aqueous layer, containing titanium values, is treated with aqueous ammonium hydroxide to precipitate hydrated titanium dioxide, which is then calcined in step (e) to form pigmentary $TiO_2$. The resulting aqueous ammonium fluoride filtrate can be recycled directly to the digestion step (a) or evaporated to dryness to form dry ammonium fluoride and then used in the digestion step as a melt. Optionally, the recovered ammonium fluoride solution can be converted by the process of electrodialytic water-splitting, as shown in FIG. 1, to an aqueous solution of ammonium hydroxide for recycle to the precipitation step (d) and aqueous hydrogen fluoride for recycle to the digestion step (a). The extractant organic layer from step (b), containing iron impurities, is itself extracted with, for example, an aqueous solution of ammonium carbonate to extract out iron impurities. The resulting iron extracted organic layer is then recycled for reuse to step (b). The aqueous ammonium carbonate extract, containing the iron impurities, is treated with a small amount of base to precipitate ferric hydroxide and then filtered to separate ferric hydroxide which is then converted, usually by calcining, to produce iron (III) oxide, $Fe_2O_3$, which itself can be utilized as a pigment. The aqueous ammonium carbonate can then be recycled for extraction of the organic extractant layer in the next cycle.

In the process, steps (a), (c), (d) and (e), not including the oxidation step, are conventional and known in the art and are adequately described in the patents, U.S. Pat. Nos. 1,501,587 and 2,042,435, hereby incorporated by reference, which describe various process modifications that can be utilized with respect to reaction temperature, concentration of reagents and sequential order of processing steps in improving yield, particle size and pigmentary quality of formed $TiO_2$. The novel feature and advantage of this improved process is that an organic extractant is used for extracting out ferric iron impurities, thus eliminating the need for the use of large volumes of ammonium fluoride in step (b), which are normally used in the prior art for separating and precipitating the iron impurities from the aqueous solution of titanium values.

The mechanism of the extraction of ferric iron impurities by the organic extractant is not well understood. One theory, that we do not wish to be bound by, is that the organic extractant and iron cations in the iron impurities form an organometallic complex which firmly binds the ferric iron cations and allows the extraction process to occur.

The organic extractant used in the process is a mono- or dialkyl, or mono- or di(alkylphenyl)orthophosphoric acid, or alkali metal or ammonium salt thereof, wherein the alkyl radical is linear or branched and contains 4 to 18 carbon atoms.

Representative alkali metal salts of the organophosphoric acids include lithium, sodium, potassium salts and the like. Representative orthophosphoric acids that are applicable in the invention include n-butyl-, di-(n-butyl)-, n-hexyl-, 2-ethylhexyl-, di-(2-ethylhexyl)-, n-octadecyl-, di-(n-octadecyl)-, octylphenyl-, and di-octylphenyl orthophosphoric acid, wherein the octyl radical is linear or branched, and the like. A preferred acid in the process is di-(2-ethylhexyl)orthophosphoric acid, also referred to herein as $D_2EHPA$, and a preferred salt is the ammonium salt of di-(2-ethylhexyl)orthophosphoric acid.

The organic extractant is normally dissolved in an inert organic solvent for use in the liquid-liquid extraction step. The organic solvent should be inert under the extraction conditions, form a separate layer with the aqueous acidic solution from the digestion step and should be a good solvent for the organic extractant and the resulting iron-extractant complex. Representative classes of organic solvents which are applicable in the invention include aromatic hydrocarbons, containing 6 to 8 carbon atoms, halogenated aromatic hydrocarbons, containing 6 to 8 carbon atoms and 1 to 3 halogen atoms, wherein the halogen may be fluorine, chlorine, bromine or iodine, saturated aliphatic hydrocarbons containing 5 to 12 carbon atoms and kerosene of boiling range of about 180° to 300° C. Representative examples of solvents applicable in the invention include benzene, toluene, xylene, orthodichlorobenzene, trichlorobenzene, n-octane and kerosene. A preferred organic solvent for use in the process is kerosene.

The amount of solvent used is usually about 2 to 10 parts of solvent by weight per part of organic extractant. A preferred range is 4 to 10 parts of solvent by weight per part of organic extractant.

The amount of organic extractant used is usually at least about 2 moles of organic extractant per mole of ferric iron impurity, and usually about 2 to 3 moles of organic extractant per mole of ferric iron impurity is used. Larger amounts of organic extractant may be effectively employed, subject to economic restraints.

In general, the amount of organic extractant layer used is about 0.5 to 5 volumes per volume of aqueous solution, containing titanium and iron values from the digestion step. However, larger or smaller volumes can also be effectively employed.

The temperature at which the extraction is conducted is between about 10° and 90° C., and preferably at about room temperature.

The pH of the aqueous acidic fluoride solution is between about 1.0 to 6.0 and preferably about 1 to 4. Higher pH values above 6.0 tend to lead to formation of iron hydroxides which form gelatinous precipitates and adversely affects the extraction process.

Conducting the process within the above-defined pH range and according to the above-described process variables leads to substantial separation by extraction of the iron impurities from the aqueous acidic fluoride solution.

The valency of titanium in the ilmenite ore, as represented by the formula $FeO.TiO_2$ is normally four. However in solution the element is capable of exhibiting different valencies in the presence of oxidants and reductants. In the present instance no attempt was made to determine the valence states of titanium. It should however be pointed out that no significant extraction of titanium was noticed when the said organic extractants were added to ilmenite acid fluoride solutions in instances where oxidizing agents were and were not added. We regard that no significant extraction of titanium value from aqueous acidic fluoride solutions occurs under the invention process conditions, regardless of the valence states it might possess in such acid solutions.

In the process, the iron impurities in the aqueous acidic fluoride solution after digestion are oxidized to the ferric iron state with a suitable oxidizing agent prior to the extraction step. The oxidizing agent is usually used in an amount of about 1 to 2 equivalents per equivalent of dissolved iron impurity, wherein by the term "equivalent" is meant the amount of oxidizing agent that will completely oxidize one equivalent of iron (II) in the impurities to iron (III). The oxidizing agent should be water-soluble and an effective agent for oxidation of Fe (II). Suitable oxidizing agents include hydrogen peroxide, air, oxygen, sodium peroxide and the like. A preferred agent is hydrogen peroxide.

The extraction yields of ferric iron impurities in the process are usually about 95–99, or greater, numerical percent of the iron impurities originally in the aqueous acidic digestion solution.

The amount of titanium value retained in the aqueous acidic digestion solution, following extraction is generally about 95 to 99 numerical percent of the titanium value originally present in the solution.

The novel step of extracting out ferric iron impurities by the use of an organophosphoric acid, as described herein, is not only applicable to recovery of $TiO_2$ from ilmenite-type ore, but is also applicable to other situations where it is desired to separate out ferric iron values from an aqueous acidic fluoride solution at a pH between about 1.0 and 6.0, consisting essentially of dissolved titanium and ferric iron values. Thus, a further subject of this invention is the process of separating ferric iron values from titanium values in aqueous acidic fluoride solution at a pH between about 1.0 and 6.0 by the use of an organophosphoric acid, as described herein, under the conditions of concentration, organic solvent, temperature, and the like, as described herein.

The following examples are illustrative of our invention and set forth the best mode which we have contemplated of carrying out the invention, but should not be construed as being limitations on the scope and spirit of the instant invention. Parts given are by weight unless otherwise indicated.

EXAMPLE 1

Digestion of Ilmenite Ore

A sample of ilmenite ore, weighing 90.21 grams and containing 37.3 weight percent titanium and 19.7 weight percent iron, was digested with 370.7 grams of 25.2 weight percent hydrogen fluoride solution. The digestion was carried out by heating the combined mixture under reflux over about a 24 hour period at 95° to 100° C. The resulting slurry was then centrifuged and the remaining residue washed with water and dried. Analysis of the digestion solution showed that 98 numerical percent of the titanium, and 99.5 numerical percent of the iron, contained in the ilmenite ore, had been extracted from the ore under these conditions.

EXAMPLE 2

Extraction of Iron Impurities With Di-(2-Ethylhexyl) Orthophosphoric Acid ($D_2EHPA$)

A 25 ml. solution of digested ilmenite ore in aqueous hydrofluoric acid, containing 2.45 weight percent iron and 3.77 percent titanium, having a pH of about 1.5 as measured by a conventional pH meter, (a Chemtrix TM type 45 pH meter, having an accuracy of about ±0.2 pH units) was mixed with 3 ml of a 30% hydrogen peroxide solution and extracted with 75 ml of a 15% volume/volume solution of $D_2EHPA$/kerosene for 30 minutes and the layers separated. Subsequently, the separated aqueous layer was again extracted with 25 ml of a fresh portion of the $D_2EHPA$/kerosene solution. The aqueous and organic layers were separated and the separated aqueous layer was again extracted with 25 ml of a fresh portion of the organic extractant solution. The resulting aqueous layer and organic extracts were then analyzed for iron and titanium contents and the results, expressed as weight percentages of the metal in the resulting solutions after the extraction, are summarized in Table I. The pH of the aqueous layer was measured prior to each extraction and the values also listed in the Table.

Table I

| Analysis of Layer | Aqueous | | | Organic | |
|---|---|---|---|---|---|
| | % Iron | % Titanium | pH | % Iron | % Titanium |
| Original digestion solution | 2.45 | 3.77 | 1.5 | — | — |
| After extraction with 73 ml of $D_2EHPA$/kerosene | 0.22 | 3.32 | 1.5 | 0.80 | 0.025 |
| After second stage extraction with 25 ml of $D_2EHPA$/kerosene | 0.074 | 3.28 | 1.5 | 0.20 | 0.013 |
| After third stage extraction with 25 ml of $D_2EHPA$/kerosene | 0.01 | 3.25 | 1.5 | 0.07 | 0.015 |

The total extraction of iron from the aqueous solution was found to be 99.5 numerical percent of the iron originally present in the original digestion solution, and the amount of titanium retained in the aqueous layer after the extractions was found to be 98 numerical percent of the titanium originally present in the original digestion solution. The slight decrease in the titanium concentration as noted is due to a dilution of the original aqueous digestion solution during the extraction process.

EXAMPLE 3

Extraction of an Aqueous Digestion Solution with the Ammonium Salt of Di-(2-ethylhexyl)orthophosphoric acid The ammonium salt of $D_2$EHPA was prepared by addition of a stoichiometric amount of ammonium hydroxide solution to a solution of di-(2-ethylhexyl)orthophosphoric acid. Thirty ml of an aqueous hydrofluoric acid solution containing 3.5% iron and 6.5% titanium having a pH of about 1.5, was mixed with 3 ml of a 30% hydrogen peroxide solution and then subjected to extraction with 125 ml of the above-prepared solution of the ammonium salt of $D_2$EHPA in kerosene solution for 30 minutes. The layers were separated and the separated aqueous layer was again subjected to extraction with 60 ml of a fresh portion of the organic extractant for 30 minutes. After separation of the layers, the aqueous layer was again subjected to countercurrent extraction with 30 ml of a fresh portion of the organic extractant for 30 minutes. The aqueous layer and invidual organic layers were then analyzed for iron and titanium contents. The pH of the aqueous layer was measured prior to each extraction and the values listed below. The results, expressed as weight percentages of the metal in the resulting solutions after extraction, are summarized in Table II.

Table II

|  | % Iron | % Titanium | pH of Aqueous Layer |
|---|---|---|---|
| Original digestion solution | 3.5 | 6.5% | 1.5 |
| Organic layer after first extraction | 0.05 | 0 | 3.5 |
| Organic layer after second extraction | 0.28 | 0.0001 | 4.5[a] |
| Organic layer after third extraction | 0.05 | 0.03 | 5.0[b] |
| Final aqueous layer | 0.017 | 5 | 5.5 |

[a,b]These pH values were not measured but are regarded by us as being representative of the actual values from the trend of the experimental data.

For continuous countercurrent extraction, the total iron extraction from the aqueous layer was calculated to be 99.5 numerical percent of the iron originally present in the aqueous digestion solution, and the amount of titanium retained in the aqueous layer after the extraction was found to be 99.7 numerical percent of the titanium originally present in the original digestion solution. Again, the slight decrease in the titanium concentration as noted is due to a dilution of the original aqueous digestion solution during the extraction process.

EXAMPLE 4

Extraction of Aqueous Digestion Solutions Non-Treated and Treated with an Oxidizing Agent Two experiments were carried out to illustrate the sensitivity of the selectivity of the extraction process in removing iron and the insensitivity in the retention of titanium in the aqueous layer to the presence of oxidant. An acidic fluoride solution containing digested ilmenite ore (analyzed solution as containing the following weight percentages): 3.95% Fe, 4% Ti) was extracted in Experiment #1 with an organic extractant consisting of $D_2$EHPA/kerosene. In Experiment #2 an oxidizing agent ($H_2O_2$ solution) was added to an identical ilmenite digestion solution prior to extraction by an identical organic extraction mixture. Details are summarized in Table III.

Table III

|  | Expt. 1 | Expt. 2 |
|---|---|---|
| Wt. of ilmenite solution, gms | 11.82 | 11.86 |
| pH of ilmenite solution | 2 | 2 |
| 30% $H_2O_2$ solution added, gms | — | 3.09 |
| Organic Extractant D2HEPA/Kerosene) |  |  |
| (20% v/v added) gms | 41.50 | 41.5 |
| Analysis of organic layer after extraction (in weight percent) | 0.021% Fe 0.007% Ti | 0.79% Fe 0.096% Ti |
| Analysis of aqueous layer after extraction (in weight percent) | 3.86% Fe 3.97% Ti | 0.50% Fe 3.12% Ti |

It is seen that the addition of the oxidant solution enhances the extraction of iron, without significantly increasing titanium extraction. Consequently the overall separation of iron from titanium is increased. Also, titanium retention in the aqueous phase is seen to be relatively unaffected by the presence or absence of the oxidant.

We claim:

1. In a process for producing titanium dioxide from ilmenite-type ore including the steps of:
    (a) digesting ilmenite ore with aqueous hydrogen fluoride to form a solution of titanium fluoride compounds and soluble iron impurities;
    (b) separating substantially the iron impurities from the solution;
    (c) separating the remainder of the iron impurities by precipitating with ammonium sulfide and filtering off;
    (d) adding ammonium hydroxide to precipitate hydrated titanium dioxide and form aqueous ammonium fluoride; and
    (e) calcining the hydrated titanium dioxide to form pigmentary titanium dioxide; the improvement which comprises contacting the solution in (a) at a pH between about 1.0 and 6.0 with a water-soluble oxidizing agent and selectively separating the resulting iron impurities from titanium values in step (b) by a liquid-liquid extraction of the ferric iron impurities using as extractant a mono- or di-alkyl, or mono- or di-(alkylphenyl)orthophosphoric acid, or alkali metal or ammonium salt thereof, wherein the alkyl radical is linear or branched and contains 4 to 18 carbon atoms.

2. The process of claim 1 wherein the extractant is di-(2-ethylhexyl)orthophosphoric acid.

3. The process of claim 1 wherein the extractant is the ammonium salt of di-(2-ethylhexyl)orthophosphoric acid.

4. The process of claim 3 wherein about 99 numerical percent of the iron impurities are removed in step (b).

5. The process of claim 1 wherein the extractant is a mixture of mono-octylphenyl and di-octylphenyl orthophosphoric acid.

6. The process of claim 1 wherein the extractant is used in an amount of about 2 to 3 moles per mole of ferric iron impurity.

7. The process of claim 1 wherein step (b) is conducted at a temperature in the range from about 10° to 90° C.

8. The process of claim 1 wherein the oxidizing agent is hydrogen peroxide.

9. The process of claim 1 wherein the oxidizing agent is air.

10. The process of claim 1 wherein the liquid-liquid extraction is conducted with an inert organic solvent which forms a separate phase with the aqueous solution of titanium compounds and is a good solvent for the extractant and the ferric iron impurities in the aqueous solution.

11. The process of claim 10 wherein the organic solvent is kerosene.

12. The process of claim 10 wherein the solvent is present in amount of about 2 to 10 parts by weight per part of extractant.

13. A process for selectively extracting out ferric iron values from an aqueous acidic fluoride solution, at a pH between about 1.0 and 6.0, consisting essentially of dissolved titanium and ferric iron values, comprising contacting said solution with a solution of a mono- or dialkyl orthophosphoric acid, or alkali metal or ammonium salt thereof, wherein the alkyl group is linear or branched and contains 4 to 18 carbon atoms, in an inert organic solvent.

* * * * *